United States Patent [19]

Hill et al.

[11] 4,074,755
[45] Feb. 21, 1978

[54] ION EXCHANGE CONTROLLED CHEMICALLY AIDED WATERFLOOD PROCESS

[75] Inventors: Harold J. Hill; Joseph Reisberg; Fred G. Helfferich; Larry W. Lake, all of Houston; Gary A. Pope, Austin, all of Tex.

[73] Assignee: Shell Oil Company, Houston, Tex.

[21] Appl. No.: 779,663

[22] Filed: Mar. 21, 1977

[51] Int. Cl.$^2$ .......................................... E21B 43/22
[52] U.S. Cl. ................................... 166/252; 166/273; 166/274
[58] Field of Search ............ 166/252, 273, 274, 305 R

[56] References Cited

U.S. PATENT DOCUMENTS

| Re. 29,219 | 5/1977 | Flournoy et al. | 166/252 |
|---|---|---|---|
| 3,343,597 | 9/1967 | Gogarty et al. | 166/273 |
| 3,467,190 | 9/1969 | Dunlap et al. | 166/252 |
| 3,482,631 | 12/1969 | Jones | 166/273 |
| 3,648,770 | 3/1972 | Sydansk et al. | 166/252 |
| 3,677,344 | 7/1972 | Hayes et al. | 166/252 |
| 3,908,764 | 9/1975 | Harvey | 166/273 X |
| 4,008,767 | 2/1977 | Waite | 166/273 |
| 4,008,768 | 2/1977 | Birk | 166/274 |

*Primary Examiner*—Stephen J. Novosad
*Assistant Examiner*—George A. Suchfield

[57] ABSTRACT

A process for recovering oil by successively injecting at least a chemical slug containing an active aqueous surfactant system or thickened aqueous liquid and an aqueous drive liquid into a reservoir having a significant amount of ion exchange capacity, is improved. The ionic composition of each injected fluid is arranged to provide a ratio, between the concentration of its effectively predominate monovalent cation and the square root of the concentration of its effectively predominate divalent cation, which ratio at least substantially equals such a ratio within the aqueous fluid immediately ahead of the injected fluid.

3 Claims, 1 Drawing Figure

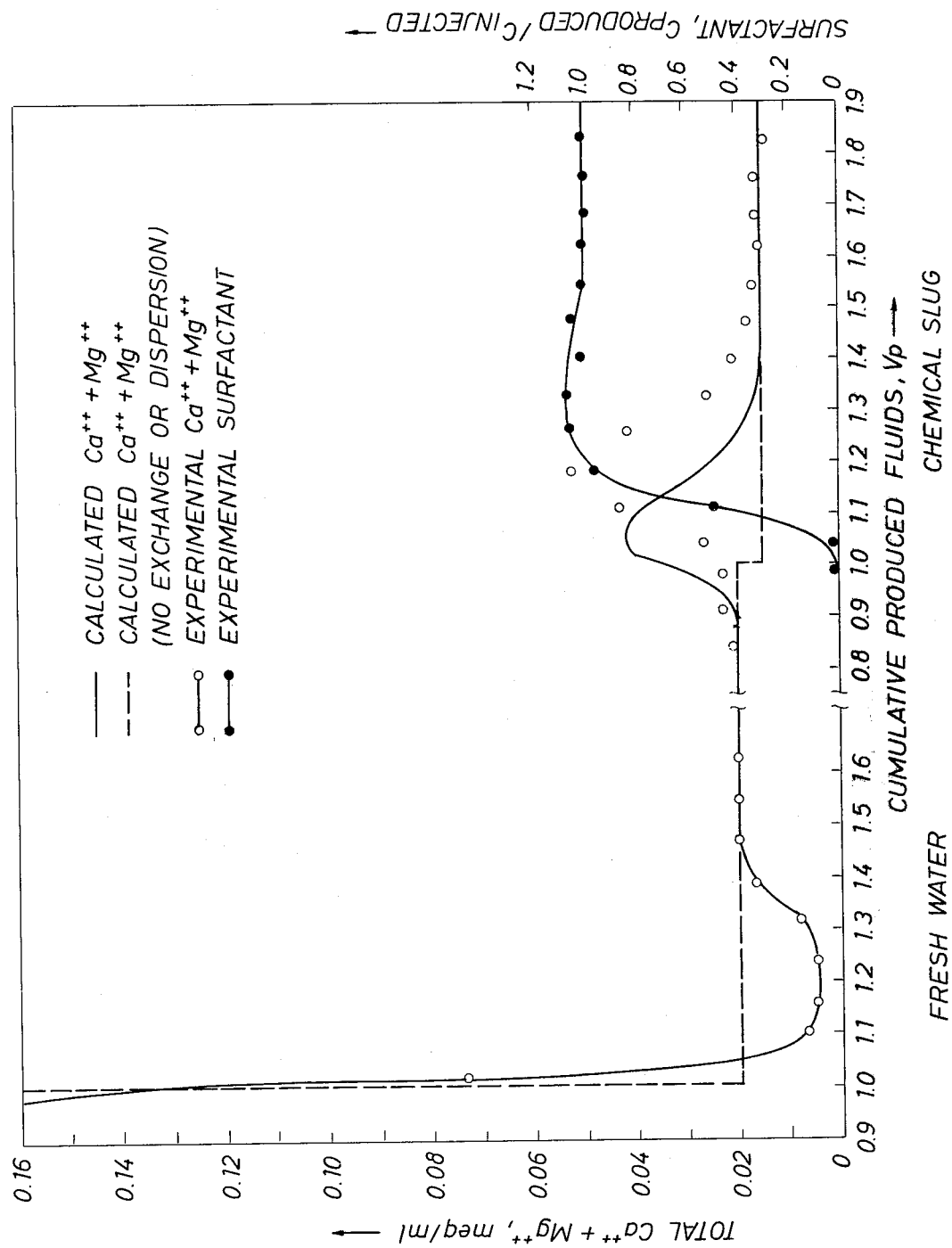

ION EXCHANGE CONTROLLED CHEMICALLY AIDED WATERFLOOD PROCESS

BACKGROUND OF THE INVENTION

This invention relates to a chemically aided waterflood oil recovery process. More particularly, it provides a process for compounding injected aqueous fluids having ionic compositions that minimize or control the amount by which those compositions are changed due to ion-exchange reactions with the reservoir rocks.

It is well known that chemical slugs, such as aqueous surfactant systems, perform most efficiently as oil recovery agents when formulated to contain specific kinds and "optimum" amounts of dissolved electrolytes or salts. Different surfactants or other chemical slugs require different amounts of salt to achieve their optimum performance. Further, it is known that the water in many, and perhaps most, reservoirs contain excessive amounts of dissolved salt. Most surfactant systems currently in use would not yield an optimum recovery efficiency if they were formulated in the water present in the reservoir being treated. Accordingly, it is common to formulate surfactant systems in low salinity waters obtained from lakes, shallow wells or other sources. These waters frequently require added salt to achieve optimum salinity and this added salt may be purchased as a commercial product and added with the surfactants. Alternatively, blends of fresh water and the saline formation water may be used to achieve optimum salinity.

Most reservoir waters and available fresh waters contain a mixture of salts. Frequently but not exclusively, the predominant cation in these waters is sodium. Some or all of the multivalent cations such as barium, calcium, magnesium, strontium, iron, aluminum, etc., are also present in these formulating waters. Iron, aluminum and other trivalent cations are normally present in insignficant quantities and, for the following discussion, will be assumed absent. It is well known that chemical slugs, such as anionic surfactant systems formulated to an optimum salinity can be drastically altered or de-optimized by the addition of more salt. Divalent cations are much more effective in de-optimizing typical formulations than are monovalent cations. An optimum surfactant system can typically withstand addition of as much as 0.25 to 1.0 percent NaCl without serious de-optimization. On the other hand, addition of less than 0.1 percent $CaCl_2$ typically decreases the systems interfacial activity seriously. Thus, as little as 50 ppm increase in calcium or magnesium ion may detract substantially from a system's oil recovery performance.

It is also known that in chemical slugs, such as polymer-thickened aqueous solutions, the viscosity of the solutions, particularly those of polyacrylamides, are more adversely affected by small increases in multivalent cation concentration than by similar increases in monovalent cation concentration.

Various procedures have previously been suggested for optimizing the performance of aqueous fluids utilized in chemically aided waterflood processes. For example, U.S. Pat. No. 3,343,597 suggests preceding the injection of an oil miscible micellar dispersion by injecting an "insulating" water slug having an ionic content matching that of the water in the micellar dispersion. U.S. Pat. No. 3,467,190 suggests injecting an aqueous surfactant slug having an optimized salt concentration for providing a minimum interfacial tension against the reservoir oil, and preceding or following that slug with an aqueous solution of the same salt concentration whenever the salt concentration of the reservoir water or drive water differs from the optimum concentration. U.S. Pat. No. 3,482,631 suggests that where an oil-displacing fluid contains an electrolyte, the leaching or sorbing of the electrolyte, when equilibrium is established at the junction between the injected fluid and reservoir water, is reduced by injecting a preflood solution having a selected electrolyte concentration and an effective viscosity at least equalling that of the reservoir fluid. U.S. Pat. No. 3,648,770 suggests determining which cation is predominate in the reservoir water, and injecting a micellar dispersion containing a petroleum sulfonate surfactant and a cation which has a greater affinity for the sulfonate than the predominate cation in the reservoir water. U.S. Pat. No. 3,915,230 suggests preceding an aqueous surfactant system of optimum salinity and hardness with a thickened aqueous preflush solution of the same salinity and hardness.

In view of the adverse effects resulting from increasing the divalent ion concentration of flooding systems which are injected at optimal salinity, it is desirable to ensure that the systems traverse the intended portion of the reservoir without being subjected to changes in composition that exceed the selected design limitations. There are, however, several physical and chemical mechanisms which operate in typical reservoirs and invariably subject the injected systems to compositional changes. Among the more important of these mechanisms are crossflow of fluids between layers of different permeability, dispersive mixing within layers between the fluids being displaced and the displacing fluids, minerals dissolution when a water differing from the formation water contracts the reservoir rocks, and cation-exchange reactions between reservoir clay minerals and the injected water.

In general, it is believed that problems due to mineral dissolution are relatively minor. In cases where dissolution may be significant, the composition of the soluble minerals are known and ions designed to suppress the dissolution can be incorporated into various stages of the chemical flood process. Alternatively, the chemical slug can be designed to tolerate the compositional changes to be expected. Physical mixing (crossflow and dispersion) of the chemical slug with formation water is generally believed to be a more difficult problem.

As previously indicated, for example, in patents such as those listed above, when the formation water is highly saline or contains relatively large amounts of multivalent cations it may be impossible, or at least uneconomical, to formulate an optimum surfactant slug having the ionic composition of the formation water. In such situations it has been common practice to formulate the chemical slug with a water of lower salinity and use a preflood or pre-slug to displace the formation water before the chemical slug is injected. Such prefloods have had various ionic compositions and/or additives to increase their viscosity, or modify the reservoir pH, or "condition" swelling clays, etc. But, in general, such prefloods have always been less saline than the formation water.

SUMMARY OF THE INVENTION

The invention relates to improving an oil recovery process of the type in which liquids are successively injected into an oil-containing reservoir. The injected liquids include at least an aqueous-drive liquid, and a chemical slug that contains at least one aqueous surfactant or thickened aqueous liquid for which a specific cationic composition is selected. The reservoir into which the liquids are injected has a significant ion-exchange capacity and contains an aqueous liquid having a cationic composition differing, in proportion or kind of monovalent or divalent cation, from the cationic composition selected for at least one aqueous liquid component of the chemical slug. And, each of the injected liquids contacts and displaces an aqueous liquid and/or oil within the reservoir.

The improvement provided by the present invention comprises the following. A determination is made of a ratio of concentrations of effectively predominant cations within the aqueous liquid in the reservoir at the time the oil recovery process is initiated. The determined ratio is at least substantially equivalent to the ratio of concentration of the effectively predominant monovalent cation to the square root of concentration of the effectively predominant divalent cation. Each aqueous liquid to be injected is compounded so that its total ionic composition provides properties selected for that liquid while its cationic composition provides a ratio of concentrations of the effectively predominant cations, which ratio has a value substantially matching that of such a ratio within the aqueous liquid that will be contacted and displaced by the compounded liquid. And, the compounded liquids are injected into the reservoir so that their cationic compositions minimize the amount by which the cationic compositions selected for the aqueous liquid components of the chemical slug are changed by an exchange of ions between those liquid components and the reservoir rocks.

DESCRIPTION OF THE DRAWING

The drawing illustrates a graph of the variations in concentration of cations and surfactants with amounts of fluid produced from a sand pack through which solutions of those materials were flowed.

DESCRIPTION OF THE INVENTION

The present invention is, at least in part, premised on discoveries such as the following. The prior procedures for controlling the cationic compositions and efficiencies of injected aqueous fluids often fail to maintain the selected compositions when the reservoirs into which the fluids are injected have a significant ion exchange capacity and contain an aqueous liquid having a cationic composition that differs from the selected composition with respect to the proportion or type of monovalent or divalent cations that are present. And yet, in the same reservoir it may be possible to avoid any significant change in the cationic compositions that are selected for such injected fluids — by compounding those fluids in accordance with the present invention.

Clay minerals are known to have a lattice structure in which the positive and negative ions do not achieve electroneutrality — the lattice retains a net negative charge. This charge on the solid minerals is, of necessity, balanced or neutralized by positive "counter-ions". When the clay is immersed in an aqueous environment, the counter-ions are substantially free to migrate, subject only to the physical requirement that electroneutrality be maintained. Thus, a clay counter-ion can migrate completely outside the zone of influence of the clay only when another ion or ions of equal charge replaces it within the zone of influence of the clay. This "exchange" of cations is well known. Further, it is known that multivalent cations are more strongly attracted to clays than are monovalent cations.

Several known equations purport to describe the equilibria between some measure of the concentration of cations associated with the clay and the concentration of cations in the "equilibrium" solution, which is in contact with the clay, yet is removed from the zone of influence of the clay. Considering a uniformly dispersed system containing only clay, water, sodium chloride and calcium chloride, two such equations are:

$$\frac{\overline{C}_{Na}}{\overline{C}_{Ca}} = K_1 \frac{C_{Na}}{(C_{Ca})^{\frac{1}{2}}} \quad (1)$$

and $$\frac{\overline{C}_{Na}}{(\overline{C}_{Ca})^{\frac{1}{2}}} = K_2 \frac{C_{Na}}{(C_{Ca})^{\frac{1}{2}}} \quad (2)$$

where: $C$ is the concentration of the indicated ion in the equilibrium solution, $\overline{C}$ refers to the concentration of the indicated ion associated with the clay (both concentrations being expressed in terms of the total volume of water, e.g., as meq/ml, or eq./l), and $K_1$ and $K_2$ are constants.

It is not known which of the above equations most completely describes the equilibria between clay counter-ions and "free" cations in the equilibrium solution. Further, the values of $K_1$ and $K_2$ are not accurately known and can be expected to be a function of clay type, temperature and perhaps other variables as well. Nevertheless, we have discovered that the above equations are useful in the present process for preventing cation exchange reactions from damaging chemical flooding processes.

The utility of those equations is illustrated in the following simple example, which assumes a value of $K$ equal to 0.15 and considers the case of a dispersed clay-water system in which the total concentration of excess negative charges associated with the clay can be expressed as 0.05 meq/ml of equilibrium solution in the system. The example further assumes that the equilibrium water contains 1 meq/ml Na$^+$ ion ($C_{Na}$), and 0.25 meq/ml of Ca++ ($C_{Ca}$). For these assumptions, since the charges associated with the clay are neutralized, $\overline{C}_{Na} + \overline{C}_{Ca} = 0.05$; and equation (1) predicts that $\overline{C}_{Ca}$, the concentration of calcium ion associated with the clay, will be 0.038 meq/ml. $\overline{C}_{Na}$, then will be (0.05)−(0.038) or 0.012 meq/ml. Equation (2) predicts $\overline{C}_{Na} = 0.036$ and $\overline{C}_{Ca} = 0.014$ meq/ml respectively.

If we remove all of the equilibrium water and its salts and replace it with a like amount of a second water in which $C_{Na} = 0.3$ and $C_{Ca} = 0.005$ meq/ml, a new equilibria between clay counter-ions and the ions in the surrounding water will be established. Equation (1) predicts, $\overline{C}_{Na} = 0.016$, $\overline{C}_{Ca} = 0.034$, $C_{Na} = 0.296$ and $C_{Ca} = 0.009$. Equation (2) predicts, $\overline{C}_{Na} = 0.041$, $\overline{C}_{Ca} = 0.009$, $C_{Na} = 0.295$ and $C_{Ca} = 0.010$. Thus, both equations predict that the new equilibrium solution will have exchanged Na$^+$ ion for Ca++ ion. A Ca++ increase of 80 ppm is predicted by equation (1) and an increase of 100 ppm is predicted by equation (2). In either case, assuming the second solution had been an aqueous micellar fluid or other aqueous surfactant system, at an optimum salinity, it is quite apparent that the cation exchange would have seriously decreased its interfacial activity or miscibility.

The present process can be illustrated in two different ways as follows:

(A) Instead of replacing solution 1 (the initial equilibrium solution) with solution 2 ($C_{Na} = 0.3$, $C_{Ca} = 0.005$), replace it with solution 2' where $C_{Na} = 0.3$ and $C_{Ca} = 0.0225$. For solution 1, $C_{Na}/(C_{Ca})^{1/2}$ (the right side of either equation) has a value of 2.00. Solution 2' also has a ratio value of 2.00 and thus it is already in equilibrium with the clays, which had been equilibriated with solution 1, and no cation exchange will occur. Thus, if solution 2' were a micellar solution at optimum salinity, it would remain at optimum salinity.

(B) Alternatively, replace solution 1 with a solution having a composition near that of solution 2 (in the first part of this example) but, if the replacing solution is an aqueous micellar solution, formulate it so that it is under optimum and will reach its optimum salinity only after undergoing some cation exchange reaction of the type indicated. However, because of uncertainty with regard to which equation applies and in the appropriate value of K, the alternative (B) is the less desirable method of practicing our invention.

When more than one divalent cation is present in the formation water, or any of the injected solutions, additional cation exchange reactions will be introduced and these reactions will result in changes in the composition of the injected fluid. These changes can de-optimize micellar solutions which are injected at an optimum salinity. De-optimization may result from increasing the relative amount of divalent ions in the solution or, depending upon the specific composition of the injected optimum salinity fluid, may result from decreasing the relative amount of divalent ions therein. In this latter case, the clays gain divalent ion (instead of yielding divalent ion as in the example above). In the general case, in which more than one monovalent and more than one divalent ion are present in the formation-water, we have discovered that cation exchange reactions can be minimized by the following procedure:

(1) Obtain several samples of the in-situ water from the objective reservoir. Analyze the samples for cations and obtain an average reservoir water analysis, in which all concentrations are expressed as reaction equivalents or meq/ml.

(2) Identify the predominate monovalent cation $C_{p+}$ (typically sodium), the predominant divalent cation $C_{p++}$ (typically calcium), the remaining monovalent cations as $C_{1+}$, $C_{2+}$, etc., and the remaining divalent cations as $C_{1++}$, $C_{2++}$, etc. Calculate the value of the ratios $C_{p+}/C_{1+}$, $C_{p+}/C_{2+}$, etc., for the monovalent cations, the ratio $C_{p+}/(C_{p++})^{1/2}$ and the ratios $C_{p++}/C_{1++}$, $C_{p++}/C_{2++}$, etc. for the divalent cations.

(3) Regarding each successive fluid to be injected in a recovery process, formulate the fluid (a) to have both the desired fluid characteristics such as viscosity, interfacial activity, miscibility with oil, etc., and (b) to have ratios of cation concentrations equal those calculated above. For example, the total salinity can be varied as desired, but the cationic concentration ratios must be maintained.

An alternative and somewhat simpler procedure which frequently provides adequate protection against deleterious effects of cation exchange follows:

(1a) Using an average analysis of reservoir water, sum up the concentrations (meq/ml) of all monovalent cations, $C_{M+}$. Sum separately the concentrations of all divalent cations, $C_{M++}$.

(2a) Calculate $C_{M+}/C_{M++}^{1/2}$.

(3a) As in step 3, above formulate each successive fluid in the process to achieve its intended purpose but also to contain monovalent and divalent cations, the sums of which yield a $C_{M+}/C_{M++}^{1/2}$ ratio equal numerically to the value found in step 2.

Other variations in the procedure for practicing our invention will be obvious to those skilled in the art and include procedures such as using the sum of all monovalent cations as in (1a) but then using individual divalent cations as in 2 to establish the pertinent field ratios to be matched in injected fluids. This particular procedure might be applied, for example, when a field water contained a large amount of one monovalent cation and only small amounts of other monovalent cations but contained about equal amounts of two or more divalent cations.

Still another variation which might be used if it were found that the specific surfactants and/or polymers available for use in a given field could not be formulated to yield an optimum solution having the ionic concentration ratios required to match the field ratios. In such a case, in order to minimize the volume of preflood required, the surfactant formulation would be optimized with cationic concentration ratios as near as possible to those found in the field water. A preflood liquid would be formulated to have the same cationic concentration ratio as the optimum slug. Samples of reservoir rock would be analyzed to determine total porosity and cation exchange capacity. These data, together with the pertinent reservoir water and preflood analytical data would be used in equations (1) and (2) to estimate the volume of preflood needed to equilibrate the reservoir clays with the preflood. A preflood volume at least as large as the largest value calculated would be injected prior to injection of the micellar fluid or other chemical slug. Thus, by making the ionic ratios as close as possible to those of the water in the reservoir, the amount of preflood required is minimized by minimizing the extent to which cation exchanges will occur.

In general, the surfactants used in the present process can be substantially any which are capable of providing an aqueous surfactant system, micellar dispersion, microemulsion, or the like, which, in the presence of appropriate concentrations of electrolyte, is capable of displacing oil within a subterranean reservoir. The present process is preferably used in conjunction with anionic surfactants capable of providing active aqueous surfactant systems having interfacial tensions against oil of less than 0.1 dyne per centimeter.

An aqueous anionic surfactant system suitable for use in the present invention can be substantially any aqueous-liquid-continuous liquid system that contains enough anionic surfactant material, with or without electrolytes, thickeners, and the like, to provide a surfactant system capable of displacing oil within a permeable material such as a subterranean reservoir. The aqueous petroleum sulfonate surfactant systems are preferred. Such systems are described in patents such as U.S. Pat. Nos. 3,330,344 and 3,348,611 to J. Reisberg on mixtures of relatively water-soluble and water-insoluble anionic surfactants; U.S. Pat. No. 3,508,612 to J. Reisberg, J. B. Lawson and G. Smith on mixtures of petroleum sulfonate and oxyalkylated alcohol sulfate surfactants; U.S. Pat. No. 3,638,728 to H. J. Hill on such a sulfonate-sulfate surfactant mixture with proportions varied for increased salt tolerance in front and increased flood water tolerance in back; U.S. Pat No. 3,712,377 to H. J. Hill and D. R. Thigpen on an emulsion modifier containing active aqueous surfactant system; U.S. Pat. No. 3,768,560 to H. J. Hill and D. R. Thigpen on an aqueous surfactant slug with chromatigraphically balanced proportions of thickener and surfactant; U.S. Pat. No. 3,945,437 to Y. C. Chiu and H. J. Hill on an aqueous anionic surfactant system containing an aromatic ether polysulfonate cosurfactant; etc.

Particularly suitable anionic surfactants comprise mixtures of relatively water-soluble and water-insoluble alkali metal salts of petroleum sulfonates (such as alkylaryl sulfonates, alkylated benezene sulfonates, and the like). For uses at temperatures below about 150° F, such mixtures can include sulfated polyoxyalkylated alcohol surfactants. Petroleum sulfonate surfactants are commercially available, for example, as Petronates and Pyronates from Witco Chemical Company; Promor Sulfonates from Mobil Oil Company, and the like. Surfactant sulfates of ethyoxylated primary alcohols are available as NEODOLS from Shell Chemical Chemical Company. Other surfactant sulfates of ethoxylated alcohols are available as Tergitols from Union Carbide, and the like.

Water thickeners can be used in, or in conjunction with, the present surfactant systems. Such thickeners can be substantially any water soluble natural or synthetic polymeric material, such as a carboxymethyl cellulose, a polyethylene oxide, a hydroxyethylcellulose, a partially hydrolized polyacrylamide; a copolymer of acrylamide and acrylic acid; biopolymers, such as the polysaccharides; or the like.

In situations in which there is a relatively strong tendency for an aqueous surfactant system to become emulsified with the oil and/or water being displaced, it may be desirable to incorporate an emulsion modifier into the system. Suitable emulsion modifiers include mono or polyamines, polyethoxylated amines, amides, sulfanamides of water soluble sulfonic acids, water-soluble oil-insoluble petroleum sulfonates, ketones, alcohols, and the like. The lower alcohols, such as isobutyl alcohol, and the polyethoxylated amines, such as Ethoduomeens T/25 or T/20 are particularly suitable.

In accordance with the present process the electrolyte content of the aqueous fluids to be injected are arranged to satisfy two criteria by having (a) a total ionic composition that provides properties selected for the particular fluid, and (b) a cationic composition that provides the selected determined values for the ratios between at least the most predominate (or effectively predominant) monovalent and divalent cations. In the case of a preflood solution, both the total ionic and cationic contents are usually arranged to modify the ionic content, particularly cationic content of the water then in the reservoir to be treated. Regarding chemical slugs containing an active aqueous surfactant system and/or a thickened aqueous liquid, the total ionic content is arranged to provide an optimum or near optimum electrolyte content for the particular surfactant or thickener, while a cationic concentration is concurrently arranged to provide the specified ratio values approximating those of the preceding aqueous liquid. In general, the same is true regarding the frontal portion of the drive fluid, with the remainder of the drive fluid having both an electrolyte and thickener concentration that is relatively gradually increasing or decreasing to become similar to that of the aqueous liquid which provides the bulk of the drive fluid. Such adjustments of the electrolyte concentrations can be effected by adding or removing water soluble salt, e.g., by precipitate-forming water softening treatments for removing multivalent cations, by exchanging multivalent cations for monovalent ions or hydrogen ions, by adding monovalent ion salts, such as sodium chloride, or the like procedures.

The determinations of the relative proportions in which cations are contained in the aqueous fluid in the reservoir into which a chemical slug is to be injected in accordance with the present process, can utilize techniques and devices which are known and available. Samples of the reservoir water can be obtained and analyzed, the determinations can be effected by means of logging the well to be treated, or by means of data from other wells in the same field or formation, etc.

Laboratory Test Example of Prior Art Preflood

For the experiment providing the data shown in the drawing, a one-inch diameter by two-foot long sandpack was prepared from disaggregated Tar Springs sandstone. The cation exchange capacity, $Q_v$, of that sandstone was about 0.44 meq/100 gm. After saturating the pack with a saline Tar Springs formation water, 3.8 pore volumes of the same water was flowed through the pack at a frontal advance rate of one foot per day, with the pack at a temperature of 85° F. The effluent composition became equal to the injected composition after a flow-through of about 0.4 $V_p$. The water in the pack was then displaced with a preflood water containing 7.5 percent formation water mixed with a fresh lake water. After 1.5 pore volumes of preflood water injection, steady-state composition was achieved, but the flow was continued to a total preflood water injection of 4.4 $V_p$. After this pack equilibration period, 3.7 pore volumes of a chemical slug prepared in lake water containing 5 percent formation water was injected. Steady-state composition was achieved after 1.5 $V_p$. Table I lists the compositions of the fluids used.

TABLE I

| FLUID | DESCRIPTION | $Ca^{++}$ | $Mg^{++}$ | Cl meq/ml | $SO_4^=$ | SURF |
|---|---|---|---|---|---|---|
| 1 | Formation Water | 0.1720 | 0.0953 | 1.203 | — | — |
| 2 | Pre-Flood Water | 0.0127 | 0.0074 | 0.093 | — | — |
| 3 | Chemical Slug | 0.0115 | 0.0038 | 0.073 | 0.0256 | 0.0569 |

Pertinent data, given in the drawing and Table I, show that the preflood water "loaded" the clays with calcium and magnesium. The chemical slug, which contained a softer water, "unloaded" those ions from the clays. The concentration of divalent ions in the front part of the chemical slug increased from 0.0153 meq/ml to 0.051 meq/ml. Calculated as $Ca^{++}$ only, this is equivalent to an increase from 306 ppm to 1020 ppm, an amount sufficient to radically alter interfacial and viscometric properties of the system.

In the present illustration, equation (2) was used (squared) to calculate $C_{Na}$ and $C_{Ca}$. $K_2$ for this calculation was taken as 0.15. $C_{Mg}$ was calculated from the equation $$\frac{\overline{C}_{Ca}}{\overline{C}_{Mg}} = K_3 \frac{C_{Ca}}{C_{Mg}} \quad (3)$$

and $K_3$ was taken as 1.5; recognizing that these K values will in general vary with the type of clay, some ionic strength parameter, and temperature. Another basic assumption in the data shown is that the total exchangeable cation concentration associated with the clay (the cation exchange capacity, $Q_V$) is constant. Thus, $$\overline{C}_{Na} + \overline{C}_{Ca} + \overline{C}_{Mg} = Q_V \quad (4)$$

Equations (2), (3) and (4) are readily solved for the concentration of ions associated with the clay as a function of the solution concentrations. These relationships plus the continuity equations (one for each species) are sufficient for a mathematical solution with given initial and boundary conditions.

For the particular case illustrated, we solved the continuity equations numerically accounting for dispersion. The result is shown as the solid line in the FIGURE. For this calculation, we used 0.022 meq/ml for the $Q_v$ of the sandpack, a value slightly higher than, but within the probable experimental error of, the 0.018 meq/ml calculated from the 0.44 meq/100 gm determined for a separate sample of the sand. Calcium and magnesium concentrations were calculated separately and then summed to obtain the curve shown. As indicated in the drawing, the agreement between experimental and calculated composition is excellent for the preflood water displacement of the water previously in the pack. The experimental increase in divalent ion concentration for the chemical slug displacement of the preflood water occurs later and is larger than predicted. We believe the discrepancy results from the neglect of (1) surfactant adsorption and (2) surfactant-divalent cation interaction to form micellar or ionic complexes. Other as yet unrecognized interactions may also be involved at this displacement front.

Exemplification of Oil Treatment Operation

The following examples are described in terms of procedures which could be used in a field operation. By utilizing assumptions of the type indicated above, calculations have been made of comparisons to be expected between uses of the present process and prior processes in similar situations.

EXAMPLE I (Prior Art Chemical Flood)

Assume that the water in the reservoir to be treated contains 1.2 meq/ml of NaCl and 0.25 meq/ml of $CaCl_2$. No other salts are present (in other than trace amounts). It is uneconomical to prepare a suitable chemical flooding formulation directly in such water. A source of fresh water is, however, assumed to be available in the field. This fresh water contains 0.01 meq/ml NaCl and 0.002 meq/ml $CaCl_2$.

An optimized aqueous surfactant chemical formulation (having a minimum interfacial tension with the reservoir crude) is prepared in a liquid containing 90 percent of the available fresh water and 10 percent formation water. The formulation contains 5 percent (0.05 meq/ml) of a mixture of petroleum sulfonate surfactants and sulfated ethoxylated alcohol cosurfactants, 500 ppm (0.05%) of a suitable polymer, such as a biopolymer (for mobility control), a total of 200 ppm (0.02%) oxygen scavenger and biocide and 94.93% of the blend of available waters.

The optimized chemical formulation is sensitive to changes in ionic composition and can tolerate an increase or decrease in calcium ion concentration of only about 50 ppm before interfacial tension between the slug and reservoir crude would increase significantly. A change in sodium ion concentration would also reduce interfacial tension (IFT) activity but significant decrease would not occur for sodium ion concentration changes less than ± about 500 ppm. In view of the sensitivity of the formulation, a preflood is conducted with the same blend of waters used to prepare the chemical formulation. Further, since a relatively small slug of the chemical formulation is to be used, the chemical slug will be driven through the reservoir with a polymer dissolved in the same 90/10 fresh water/reservoir water blend used for the preflood and the slug.

To insure that the preflood will effect a complete displacement of the reservoir water, 100 ppm of a suitable polymer is dissolved in the preflood and two full pattern pore volumes of this preflood are injected into the reservoir (e.g., through a center injector of a one-acre five-spot pattern of wells). After injecting approximately nine-tenths of the preflood, samples of produced water are taken at the four producers. These samples are found to have the same ionic composition as that of the injected preflood.

Following injection of the preflood, a 0.25 pore volume of the chemical formulation is injected. This chemical slug is followed by 1.5 pore volumes of the polymer drive solution.

Samples taken at regular intervals from the four producers fail to give the expected response. Oil breakthrough occurs about as expected, but the oil cuts are lower than expected. Total oil moved from the pattern is only about 60 percent of the expected amount. At chemical slug breakthrough, the concentration of calcium ion in the slug is 300 ppm higher than was present in the injected slug. This increase in calcium ion concentration increases the interfacial tension between the slug and reservoir crude, thus reducing oil recovery. A series of post-pilot core holes on a line from the central injector to one of the producers shows that the residual oil in place is reduced to near zero saturation percent at the injector, but increases to above 20 percent near the producer. The average $S_{or}$ is approximately 12 percent.

EXAMPLE II (Present Process Using the Same Field and the Same Chemical Slug as Example I)

A second one-acre pilot area is selected in the same field. Following one of the alternative procedures of the present invention, the specified determination of the value of $C_{Na}/C_{Ca}^{1/2}$ ratio for the reservoir water indicates a value of about 2.39. The chemical slug used in Example I contains 0.175 meq/ml of sodium ion, 0.027 meq/ml calcium ion, 0.05 meq/ml surfactant, 0.148 meq/ml chloride ion and 0.004 meq/ml anion from polymer, biocide and oxygen scavenger. The ratio $C_{Na}/C_{Ca}^{1/2}$ for the slug is, therefore, $0.175/(0.027)^{1/2}$ or 1.07. Since this slug is sensitive to relatively small changes in ionic composition and requires a preflood, a preflood is designed so that $C_{Na}/C_{Ca}^{1/2} = 1.07$ and both $C_{Na}$ and $C_{Ca}$ are as close as practical to the corresponding values for the slug. This necessitates adding NaCl to the preflood. Since the available commercial NaCl contains 1 percent $CaSO_4$, it is necessary to formulate the preflood to contain 0.275 percent commercial NaCl in a blend containing 90 percent of the available fresh water and 10 percent formation water. $C_{Na}$, $C_{Ca}$ and $C_{Na}/C_{Ca}^{1/2}$ for this blend were 0.175, 0.027, and 1.065, respectively. A polymer drive is also formulated to yield $C_{Na}$, $C_{Ca}$ and $C_{Na}/C_{Ca}^{1/2}$ of 0.176, 0.027 and 1.07, respectively.

The injection of the preflood is initiated and samples of produced fluids are analyzed. After approximately one pore volume of preflood injection, it is found that produced water analysis coincides with injection water analysis. The injection of the 0.25 pore volume chemical slug is initiated. The reservoir now (due to the preflood) contains an aqueous liquid in which $C_{Na}/C_{Ca}^{1/2} = 1.07$. The chemical slug injection is followed by the polymer drive. Oil breakthrough is observed after the expected total volume of injection, oil cuts are higher than for the previous pilot and more total oil is produced. When the chemical slug reaches the producers, it is found to have essentially the same ionic composition as when injected. Post-pilot core holes show that the oil saturation gradient (0–20%) found from injector to producer for the first pilot is not present. Average residual oil saturation is less than three saturation percent.

EXAMPLE III (Present Process Using the Same Field as Example I With a Modified Chemical Slug)

In a third area of the same field, a preferred design according to the present invention is utilized. The chemical slug to be injected is reformulated to be optimum at $C_{Na} = 0.2$, $C_{Ca} = 0.007$, $C_{Na}/C_{Ca}^{1/2} = 2.39$ or essentially the same as the value of $C_{Na}/C_{Ca}^{1/2}$ for the reservoir water. This formulation required the addition of salt to a blend of the available waters containing 2 percent formation water and 90 percent fresh water.

Both preflood and the first stage polymer drive were formulated to $C_{Na} = 0.2$, $C_{Ca} = 0.007$, and $C_{Na}/C_{Ca}^{1/2} = 2.39$. In this procedure, only 0.2 pore volume preflood is injected. This is followed by 0.25 pore volume chemical slug and an 0.2 pore volume polymer drive formulated as above. Following this first increment or "buffer" zone of polymer drive, additional polymer dissolved in the available fresh water is injected. This latter polymer drive has a $C_{Na}$, $C_{Ca}$ and $C_{Na}/C_{Ca}^{1/2}$ of 0.015, 0.002 and 0.335, respectively. It, therefore, loses calcium ion to the reservoir clays. At equilibrium with the clays, the drive has a $C_{Na}$, $C_{Ca}$ and $C_{Na}/C_{Ca}^{1/2}$, respectively, of 0.01695, 0.00005 and 2.4. Thus, both a low total salinity and an extremely low amount of calcium ion allowed the use of minimal amounts of polymer to achieve the necessary effective viscosity. Results from this test are essentially identical to those from Example II, i.e., good oil recovery and a produced chemical slug containing the same ionic composition as the injected slug. This drive is, however, completed in significantly less time since only 0.2 $V_p$ preflood is required instead of the 1 $V_p$ used in the prior example.

EXAMPLE IV (Present Process, in a Reservoir Containing Ca and Mg Ions)

Assume that a chemical flood is planned for a sandstone reservoir known to contain clay minerals. A nearby lake constitutes a source of fresh water. Samples of reservoir and lake waters are obtained and analyzed. Pertinent analyses and values of the concentration ratios are given in table 1

Table 1

| ANALYTICAL DATA FOR AVAILABLE WATERS | | |
|---|---|---|
| | FIELD B | |
| WATER SOURCE | RESERVOIR | LAKE |
| Sodium ion, meq/ml | 0.6070 | 0.0050 |
| Calcium ion, meq/ml | 0.1030 | 0.0025 |
| Magnesium ion, meq/ml | 0.0515 | 0.0015 |
| All other cations, meq/ml | 0.0005 | 0.0001 |
| $C_{Na}/C_{Ca}^{1}$ | 1.89 | 0.100 |
| $C_{Ca}/C_{Mg}$ | 2.00 | 1.67 |

Using standard screening techniques, such as phase behavior studies, interfacial tension measurements and core flood tests (each of which are carried out at reservoir temperature with reservoir crude), a mixture of surfactants is found which give good performance when dispersed. In an ionically balanced system containing a 50/50 blend of the available waters.

This system contains a total of 90 percent of the 50/50 water blend. All chemicals, including surfactants, co-surfactants, cosolvents, polymer, biocide, oxygen scavenger and added inorganic salts accounted for the remaining 10 volume percent. Table 2 gives the ionic contributions from the various components.

Table 2

| | IONIC CONTRIBUTION OF COMPONENTS TO CHEMICAL FLOODING SYSTEM | | | | |
|---|---|---|---|---|---|
| IONIC PARAMETER | FORMATION WATER | LAKE WATER | CHEMICALS[1] | NaCl[2] | TOTA |
| Sodium ion, meq/ml | 0.2732 | 0.0023 | 0.105 | 0.0345[3] | 0.415 |
| Calcium ion, meq/ml | 0.0464 | 0.0011 | 0.0005 | 0.0004 | 0.0484 |
| Magnesium ion, meq/ml | 0.232 | 0.0007 | 0.0002 | 0.0001 | 0.0242 |
| All other cations | 0.0002 | 0.0000 | 0.0000 | 0.0000 | 0.0002 |
| $C_{Na}/C_{Ca}^{1}$ | | | | | 1.89 |
| $C_{Ca}/C_{mg}$ | | | | | 2.00 |

[1]Includes all chemicals added except salt.
[2]Commercial salt containing $CaSO_4$ + $MgSO_4$ impurities.
[3]Equivalent to 0.205 percent commercial salt containing 1.3% $CaSO_4$ and 0.3% $MgSO_4$.

Comparison of $C_{Na}/C_{Ca}^{1/2}$ and $C_{Ca}/C_{Mg}$ ratios for the chemical formulation (Table 2) with those for the reservoir water (Table 1) shows that the ionic balance of the chemical formulation is such that it is "pre-equilibrated" with the reservoir clays. Minimal cation exchange will result when it is injected into the reservoir.

Since screening tests indicate that this chemical formulation has a wide tolerance for mixing with either the formation water or the fresh lake water it is decided to use the formulation without a preflood. A 0.1 pore volume slug is injected into the center well of a one-acre five-spot. This slug is driven with a polyacrylamide solution dissolved in fresh lake water. $C_{Na}/C_{Ca}^{1/2}$ for the polymer drive is 0.11 and $C_{Ca}/C_{Mg}$ is 1.67. These values indicated that the drive would lose multivalent ion to the reservoir clays. In this case, the projected loss is desirable since increasing the relative amount of multivalent ion on clays is known to provide some protection against clay swelling. Further, it is also known that substituting monovalent cation for multivalent cation in polyacrylamide solutions results in a desirable increase in the viscosity of the solution. Oil moved from the pilot test area amounts to 90 percent of the residual oil originally present. Post-pilot core holes would find an $S_{orc}$ of 0.03. Chemical slug sampled at the producing wells would indicate minimal exchange reactions have occurred.

EXAMPLE V (Prior Art Polymer Flood)

This exemplifies a failure to use the present process in converting a simple waterflood to a polymer flood. It assumes that waterflooding has been underway for some time. The injected waterflood water contained only sodium and calcium cations; $C_{Na} = 0.10$, $C_{Ca} = 0.05$, $C_{Na}/C_{Ca}^{1/2} = 0.45$. It also assumes that a substantial increase in polymer solution viscosity is achieved when the water is softened and, it is decided to soften water for a pilot flood. After the softening, $C_{Na}$ is 0.15 meq/ml and $C_{Ca}$ is 0.00. After adding 1000 ppm polyacrylamide, $C_{Na}$ is 0.155 meq/ml. When such a flood is conducted, the results are unexpectedly discouraging. The produced polymer has lower than injected viscosity, $C_{Na}$ is 0.102 and $C_{Ca}$ is 0.053 meq/ml. Calcium ion is regained as the chemical slug moves through the reservoir.

EXAMPLE VI (Present Process in Same Field Using the Same Polymer Slug Cationic Concentration as Example V)

Following the present invention, a second pilot is conducted using unsoftened water ($C_{Na}/C_{Ca}^{1/2} = 0.45$), but increasing the amount of polyacrylamide to yield the desired viscosity. After adding 1200 ppm polymer, $C_{Na} = 0.106$, $C_{Ca} = 0.05$ and $C_{Na}/Ca^{1/2} = 0.47$. Response from the drive is satisfactory and the viscosity and ionic composition of the produced polymer solution is not significantly changed ($C_{Na} = 0.103$, $C_{Ca} = 0.053$, and $C_{Na}/C_{Ca}^{1/2} = 0.45$).

What is claimed is:

1. In an oil recovery process in which liquids are successively injected into an oil-containing reservoir, where the injected liquids include at least an aqueous-drive liquid and a chemical slug that contains at least one aqueous surfactant or thickened aqueous liquid for which a specific cationic composition is selected, and where the reservoir into which the liquids are injected has a significant ion-exchange capacity and contains an aqueous liquid having a cationic composition differing in proportion or type of monovalent or divalent cation, from the cationic composition selected for at least one aqueous liquid component of the chemical slug, and where each injected liquid contacts and displaces an aqueous liquid and/or oil within the reservoir, the improvement which comprises:

determining a ratio of concentrations of effectively predominant cations within the aqueous liquid in the reservoir at the time the oil recovery process is initiated, which ratio is at least substantially equivalent to the ratio of concentration of the effectively predominant monovalent cation to the square root of concentration of the effectively predominant divalent cation;

compounding each aqueous liquid to be injected so that the ionic composition of the compounded liquid provides properties selected for that liquid and the cationic composition of the compounded liquid provides a ratio of concentrations of the effectively predominant cations which ratio value substantially matches that of such a ratio within the liquid to be contacted and displaced by the compounded liquid within the reservoir; and injecting the compounded liquids into the reservoir so that their cationic compositions minimize the amount by which the cationic compositions selected for the aqueous liquid components of the chemical slug are changed by an exchange of ions between those liquids and the reservoir rocks.

2. The process of claim 1 in which the determining of ratios and compounding of fluids are conducted by:

(a) identifying the cations present in the aqueous liquid contained in reservoir prior to initiation of the oil recovery process;

(b) identifying a predominant monovalent cation;

(c) identifying a predominant divalent cation;

(d) determining the ratio of concentration of identified predominant monovalent cation to square root of concentration of identified predominant divalent cation;

(e) determining the ratio of concentration of identified predominant monovalent cation to concentration of each other identified monovalent cation found in step (a);

(f) determining the ratio of concentration of identified predominant divalent cation to concentration of each other identified divalent cation found in step (a); and (g) compounding each aqueous liquid to be injected into the reservoir so that its total ionic composition provides the properties selected for that liquid and so that its cationic composition includes each of the cations identified in step (a) at concentrations such that the ratios determined in steps (d), (e) and (f) are substantially matched.

3. The process of claim 1 in which the determining of ratios and the compounding of fluids are conducted by:

(a) summing the concentrations of all monovalent cations in the aqueous liquid in the reservoir;

(b) summing the concentrations of all the divalent cations in the aqueous liquid in the reservoir;

(c) determining the ratio of total concentration of monovalent cation to square root of total concentration of divalent cation;

(d) compounding each aqueous liquid to be injected into the reservoir so that its total ionic composition provides the properties selected for that liquid and so that the ratio of total concentration of monovalent cations to square root of total concentration of divalent cation equals the value of said ratio determined in step (c).

* * * * *